United States Patent
Cheng et al.

(10) Patent No.: US 7,930,408 B1
(45) Date of Patent: Apr. 19, 2011

(54) RESOURCE SCHEDULER WITHIN A NETWORK DEVICE

(75) Inventors: Yonghui Cheng, Santa Clara, CA (US); Yi Sun, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 134 days.

(21) Appl. No.: 12/476,315

(22) Filed: Jun. 2, 2009

Related U.S. Application Data

(63) Continuation of application No. 11/621,368, filed on Jan. 9, 2007, now Pat. No. 7,546,371.

(60) Provisional application No. 60/882,737, filed on Dec. 29, 2006.

(51) Int. Cl.
*G06F 15/16* (2006.01)
*G06F 12/00* (2006.01)

(52) U.S. Cl. ........................................ 709/227; 713/188

(58) Field of Classification Search .......... 709/227–229, 709/203, 250; 713/188, 200, 201
See application file for complete search history.

(56) References Cited

U.S. PATENT DOCUMENTS

| | | | |
|---|---|---|---|
| 6,484,187 B1 | 11/2002 | Kern et al. | |
| 7,216,161 B1 | 5/2007 | Peckham et al. | |
| 7,546,371 B1 * | 6/2009 | Cheng et al. | 709/227 |
| 2004/0001509 A1 * | 1/2004 | Zhang et al. | 370/466 |
| 2004/0162992 A1 * | 8/2004 | Sami et al. | 713/200 |
| 2004/0213209 A1 | 10/2004 | O'Connor et al. | |
| 2005/0210394 A1 | 9/2005 | Crandall et al. | |
| 2005/0273858 A1 * | 12/2005 | Zadok et al. | 726/24 |
| 2007/0027896 A1 | 2/2007 | Newport et al. | |
| 2007/0083930 A1 * | 4/2007 | Dumont et al. | 726/24 |
| 2007/0115845 A1 * | 5/2007 | Hochwarth et al. | 370/252 |

* cited by examiner

*Primary Examiner* — Zarni Maung
(74) *Attorney, Agent, or Firm* — Shumaker & Sieffert, P.A.

(57) ABSTRACT

A network device is described in which a dedicated resource scheduler monitors memory consumption to provide for improved processing of communication sessions. The scheduler maintains a dependency list of communication sessions, and reserves memory for communication sessions as requests for memory are received. The amount of memory reserved is determined based on the amount of memory currently reserved for the communication sessions in the dependency list. The network device may control ongoing communication sessions by way of window manipulation. Communication sessions are processed in a first mode when available memory has not reached a predetermined amount, while communication sessions are processed in a second mode when available memory reaches a predetermined amount.

12 Claims, 7 Drawing Sheets

RESOURCE SCHEDULER WITHIN A NETWORK DEVICE

This application is a continuation of U.S. application Ser. No. 11/621,368, filed Jan. 9, 2007, which claims the benefit of U.S. Provisional Application No. 60/882,737, filed Dec. 29, 2006, the entire content of which is incorporated herein by reference.

TECHNICAL FIELD

The invention relates to computer networks, and for example, to processing data flows in computer networks.

BACKGROUND

A typical computer network, such as an internet protocol (IP)-based network, supports communications between various network devices. The devices may, for example, include personal computers, laptops, workstations, personal-digital assistants (PDAs), wireless devices, network-ready appliances, file servers, print servers, routers, or other devices. When two devices communicate, the devices establish a communication session using a communication protocol, such as the transmission control protocol (TCP). Devices, referred to as routers, forward packets associated with the communication sessions through the physical network that connects the devices. The flow of packets between the devices for a TCP session is commonly referred to as a TCP flow.

Various kinds of processing of the TCP flow can be done by intermediate devices placed along the path taken by packets that constitute the TCP flow. Some examples of the kinds of processing currently performed on TCP flows between devices include data compression, encryption and decryption, TCP acceleration, application-layer acceleration, anti-virus processing, and intrusion detection and prevention.

SUMMARY

In general, the invention is directed to techniques for scheduling the processing of incoming packets received on communication sessions to regulate memory consumption and avoid dropping the communication sessions. The technique may be applied by an intermediate device located between network devices. For example, the techniques may be applied by an anti-virus device that monitors traffic flowing within an enterprise network between an external network and internal computing nodes.

The techniques described herein may be applied in the context of certain applications, such as anti-virus scanners. These applications often require that an entire file be accumulated before any of the file is analyzed and forwarded to the destination server or client (i.e., "file-based" anti-virus scanning). For network devices that do not have secondary storage or do not want to use secondary storage for performance considerations, main random access memory (RAM) can run out quickly, causing service interruptions. For example, a situation may occur where multiple files have been partially received, and the partially received files use up the RAM. As a result, none of the files can be fully received and processed, and so the sessions time out and are dropped. The techniques described herein may be applied to avoid problems associated with conventional intermediate devices, such as randomly dropping ongoing sessions when the main memory is exhausted until memory becomes available to handle new incoming packets.

In one example embodiment, the techniques provide a dedicated scheduler that monitors memory consumption to provide for improved processing of communication sessions such as Transmission Control Protocol (TCP) sessions. The scheduler maintains a dependency list of TCP sessions, and reserves memory for TCP sessions as requests for memory are received. The amount of memory reserved is determined based on the amount of memory currently reserved for the communication sessions already in the dependency list. Moreover, in certain example embodiments, the techniques reserve memory in an attempt to guarantee that at least one session is always able to complete processing, thus avoiding situations where high traffic volumes overload the device.

The techniques may control ongoing TCP sessions by way of TCP window manipulation. For example, in the absence of any memory bottleneck, the scheduler operates in a normal mode in which the TCP windows for all ongoing sessions remain open. When the scheduler detects a bottleneck condition, the scheduler begins to operate in a constrained mode, in which the TCP windows for all but the first TCP session on the dependency list are gradually closed. The scheduler has previously reserved enough memory for the first session in the dependency list to complete operation. The scheduler allows the first session to finish before reopening the TCP window of the next session on the dependency list. In this manner, sessions are processed in series in the order listed on the dependency list, and at least one session at a time is guaranteed to finish while the scheduler is in the constrained mode. Once the bottleneck condition has subsided, the scheduler initiates opening of all the TCP windows, and resumes processing the sessions in parallel in accordance with the normal mode.

In one example embodiment, a method comprises maintaining a dependency list of communication sessions, wherein the dependency list specifies an order in which to process the communications sessions, and wherein for each communication session the dependency list specifies an amount of memory currently reserved for the communication session. The method further comprises receiving a request to reserve memory for processing a new communication session, and determining whether an amount of memory required to process the new communication session is greater than a total amount of memory reserved for the communication sessions already listed within the dependency list. The method further comprises when the amount of memory required to process the new communication session is greater than the total amount of memory reserved for the communication sessions already listed within the dependency list, reserving memory for the new communication session in an amount equal to a difference between the amount of memory required to process the new communication session and the total amount of memory currently reserved for the communication sessions already listed to guarantee that processing of the new communication session can be completed upon processing the communication sessions already listed within the dependency list. The method also includes processing the communication sessions with the security device in accordance with the dependency list.

In another example embodiment, a network security device comprises a scheduler that maintains a dependency list of communication sessions, wherein the dependency list specifies an order in which to process the communications sessions, and wherein for each communication session the dependency list specifies an amount of memory currently reserved for the communication session. The network security device further includes a proxy module that receives a request to reserve memory for processing a new communication session. The scheduler determines whether an amount of memory required to process the new communication session is greater than a total amount of memory reserved for the communication sessions already listed within the dependency list. When the amount of memory required to process the new communication session is greater than the total amount of memory reserved for the communication sessions already listed within the dependency list, the scheduler reserves memory for the new communication session in an amount equal to a difference between the amount of memory required to process the new communication session and the total amount of memory currently reserved for the communication sessions already listed to guarantee that processing of the new communication session can be completed upon processing the communication sessions already listed within the dependency list. The network security device further includes an anti-virus engine that processes the communication sessions in accordance with the dependency list.

In yet another example embodiment, a computer-readable medium contains instructions that cause a programmable processor to maintain a dependency list of communication sessions, wherein the dependency list specifies an order in which to process the communications sessions, and wherein for each communication session the dependency list specifies an amount of memory currently reserved for the communication session. The instructions further cause the programmable processor to receive a request to reserve memory for processing a new communication session, and determining whether an amount of memory required to process the new communication session is greater than a total amount of memory reserved for the communication sessions already listed within the dependency list. The instructions further cause the programmable processor to, when the amount of memory required to process the new communication session is greater than the total amount of memory reserved for the communication sessions already listed within the dependency list, reserve memory for the new communication session in an amount equal to a difference between the amount of memory required to process the new communication session and the total amount of memory currently reserved for the communication sessions already listed to guarantee that processing of the new communication session can be completed upon processing the communication sessions already listed within the dependency list. The instructions further cause the programmable processor to process the communication sessions with the security device in accordance with the dependency list.

In a further example embodiment, an anti-virus device for processing communication sessions comprises an internal memory, an anti-virus engine that performs file-based anti-virus scanning on network traffic received via the communication sessions using the internal memory, and a resource scheduler module that prevents the communication sessions from timing out by allocating memory from the internal memory so that at least one of the communication sessions is guaranteed to be processed to completion.

The invention may provide one or more advantages. For example, the techniques described herein allow multiple sessions to be processed at the same time. The techniques allow for improved use of main memory and detection of bottleneck conditions so that such conditions may be managed. The details of one or more embodiments of the invention are set forth in the accompanying drawings and the description below. Other features, objects, and advantages of the invention will be apparent from the description and drawings, and from the claims.

DETAILED DESCRIPTION

Figure 1:
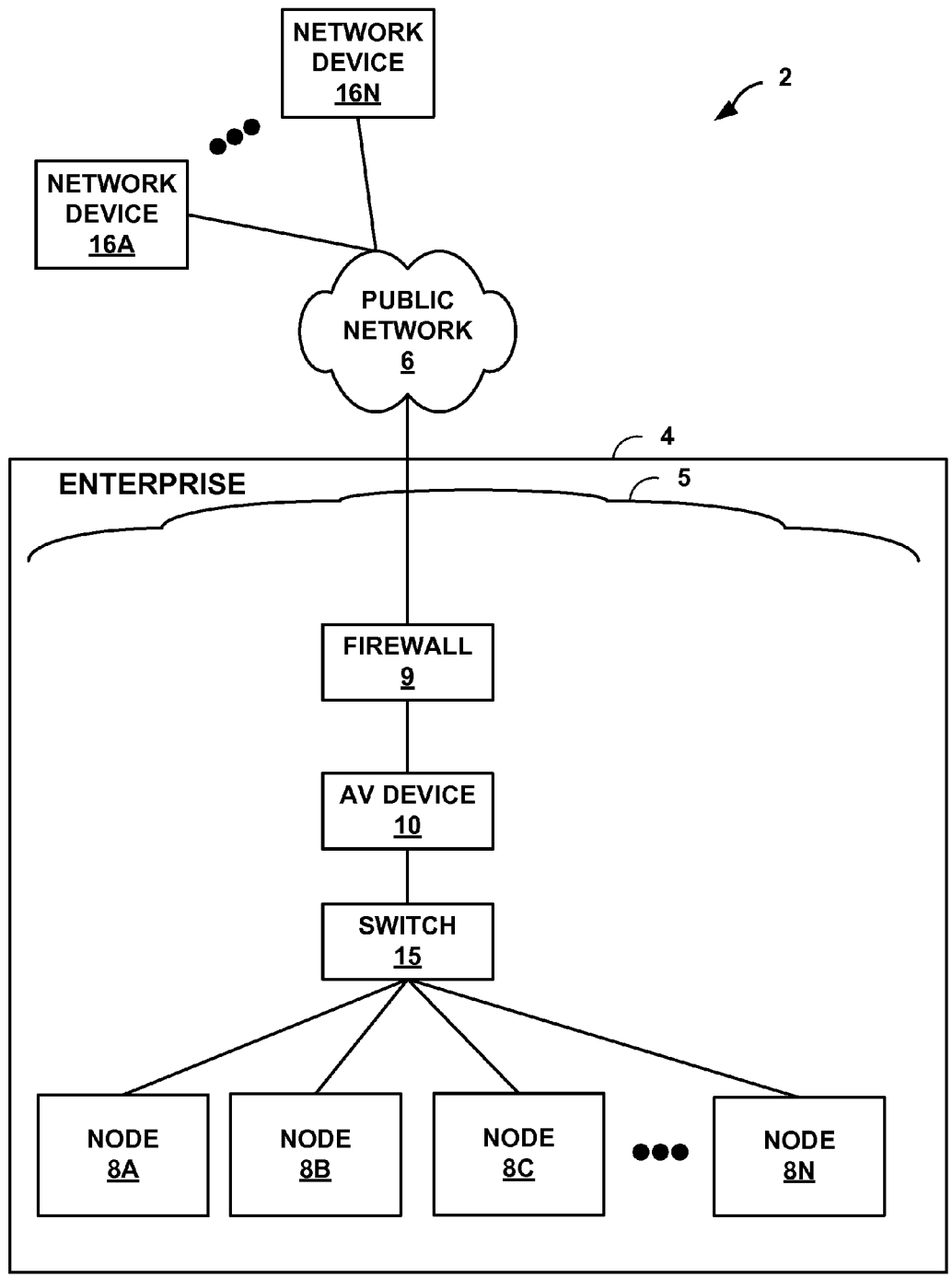
FIG. 1 is a block diagram illustrating an exemplary enterprise computer network in which an anti-virus device schedules processing of incoming packets in accordance with the principles of the invention.

FIG. 1 is a block diagram illustrating an exemplary system 2 in which enterprise 4 includes a private enterprise computing network 5 that is coupled to public network 6. Firewall 9 protects enterprise network 5 and, in particular, internal computing nodes 8A-8N (nodes 8). Nodes 8 represent any private computing device within enterprise network 5, including workstations, file servers, print servers, database servers, printers and other devices. Public network 6 may form part of the Internet.

In the example of FIG. 1, enterprise network 5 includes anti-virus (AV) device 10 that resides between firewall 9 and internal computing nodes 8 and monitors traffic flowing between firewall 9 and internal computing nodes 8. In general, anti-virus device 10 is capable of interacting with nodes 8 and network devices 16 to facilitate transmission of data through public network 6 and, more specifically, to monitor traffic flowing between firewall 9 and nodes 8.

Anti-virus device 10 may be a network security device that provides a variety of security functions, such as analyzing the network traffic to detect network attacks and scanning the network traffic for viruses. For example, anti-virus device 10 may act as a proxy between one of nodes 8 and one of external network devices 16A-16N ("external network devices 16") located outside of enterprise 4. In one embodiment, anti-virus device 10 may be transparent to nodes 8 and external network devices 16. In another embodiment, anti-virus device 10 may operate as a full proxy between nodes 8 and external network devices 16 so as to maintain separate communication sessions with the devices.

Nodes 8 and network devices 16 exchange communications using communication sessions such as Transmission Control Protocol (TCP) sessions, which typically include two streams (or connections) of TCP packets flowing in opposite directions between the devices. For example, external network device 16A may be a server and node 8A may be a client device that requests a web page from the server via a TCP stream. As another example, node 8B may be a server and external network device 16N may be a client device that uploads information to the server via a different TCP stream.

Anti-virus device 10 may process a plurality of communication sessions between nodes 8 and external network devices 16. The techniques of the invention may allow anti-virus device 10 to reduce connection dropping even in resource-congested conditions. In one example, anti-virus device 10 includes an anti-virus (AV) engine that scans application-layer communications such as files or web pages sent via the communication sessions. In accordance with the principles of the invention, anti-virus device 10 includes a resource scheduler to manage usage of internal memory resources as the AV engine processes the plurality of TCP sessions. For example, each time a new session is established, the scheduler receives a request for memory to process the new session, and adds an entry to a dependency list. Entries are generally added to the dependency list in the order the sessions are added. Each entry may, for example, specify a maximum amount of memory needed to process the session and an amount of memory reserved by the scheduler for the session.

The scheduler determines an amount of memory to reserve for processing the session by comparing the amount required by the newly requested session to an amount currently reserved for sessions represented by the dependency list. If the amount currently reserved by the dependency list is less than the amount required by the new session, the scheduler reserves (assigns) an amount of memory equal to the difference between the amount required and the amount currently reserved. In this manner, once the sessions for the previous entries have been processed, enough reserved memory will be available for processing the new session. If the amount currently reserved is greater than or equal to the amount required by the new session, the scheduler need not reserve any additional memory, since sufficient memory for the new session is guaranteed to be released once the sessions associated with the previous entries have finished processing.

In some example embodiments, anti-virus device 10 provides control of ongoing TCP sessions by way of TCP window manipulation. For example, in the absence of any memory bottleneck, the scheduler operates in a normal mode in which the TCP windows for all ongoing sessions remain open. When the scheduler detects a bottleneck condition, the scheduler begins to operate in a constrained mode, in which the TCP windows for all but a subset of sessions (e.g., the first TCP session) on the dependency list are gradually closed. The scheduler has previously reserved enough memory for the first session to complete operation. The scheduler allows the first session to finish before reopening the TCP window of the next session on the dependency list. The next session on the dependency list inherits the amount of memory that was reserved for the session ahead of it on the dependency list. As sessions are sequentially processed, the next session to be processed will inherit the total amount of memory reserved for all of the sessions ahead of it on the dependency list. In this manner, the scheduler is guaranteed to finish each of the sessions on the dependency list in sequence when in the constrained mode. Once the bottleneck condition has subsided, the scheduler initiates opening of all of the TCP windows, and resumes processing the sessions in parallel in accordance with the normal mode.

After anti-virus device 10 has completed operation on a session, such as completed scanning a file for a virus, anti-virus device 10 may take one or more programmed actions, such as automatically dropping packet flows associated with the application-layer communications within which the virus was detected. In some embodiments, enterprise network 5 may include multiple anti-virus devices 10 located within different regions (e.g., sub-networks) of enterprise network 5. A security management device (not shown) may operate as a central device for managing the anti-virus devices 10.

Although the example illustrated in FIG. 1 is described in terms of a dedicated anti-virus device 10, the techniques may be applied to any intermediate device that performs operations on communications sessions, such as data compression, encryption and decryption, TCP acceleration, application-layer acceleration, and intrusion detection and prevention. The techniques may also be applied to a firewall that performs anti-virus operations.

Moreover, the functionality described herein may be incorporated within other devices, such as firewall 9 or switch 15, or within a proxy server, load balancer, router, gateway, intelligent switch, intelligent hub, or other type of intermediate network device. The techniques are described herein in reference to TCP communications for exemplary purposes, and may readily be applied to other network communication protocols.

Figure 2:
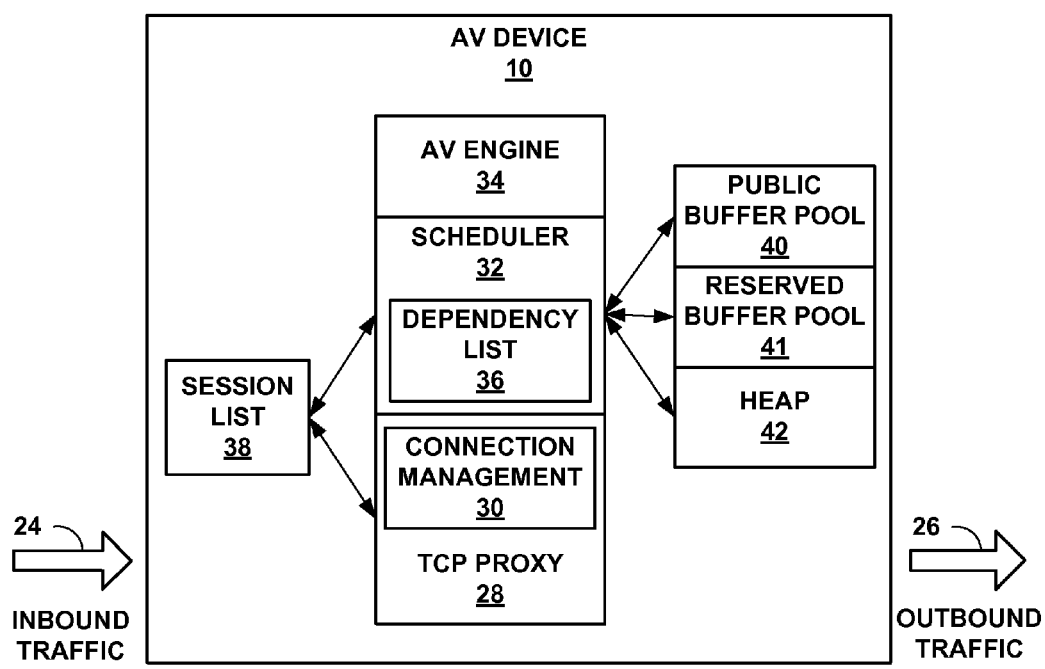
FIG. 2 is a block diagram illustrating an exemplary embodiment of the anti-virus device in further detail.

FIG. 2 is a block diagram illustrating the exemplary anti-virus device 10, described above with respect to FIG. 1, in further detail. Anti-virus device 10 monitors inbound network traffic 24 and forwards the network traffic as outbound network traffic 26. In the example illustrated by FIG. 2, anti-virus device 10 includes TCP proxy 28, connection management module 30, scheduler 32, and anti-virus (AV) engine 34. Anti-virus device 10 also includes dependency list 36, session list 38, public buffer pool 40, reserved buffer pool 41, and heap 42.

In one example embodiment, anti-virus device 10 may use TCP proxy 28 to intercept and/or establish TCP sessions with nodes 8 and network devices 16. In this example, anti-virus device 10 sends and receives packet flows using TCP protocol 28. TCP proxy 28 may participate in a three-way TCP handshake that initiates a new TCP session. When a new TCP session has been initiated, TCP proxy 28 notifies AV engine 34 of the new session, and stores information about the new session, such as the source and destination addresses, memory requirements, and type of data being transferred, in session list 38. Although described as being performed by TCP proxy 28, one or more of these functions may be performed by an application proxy or other module. When AV engine 34 needs to process a file received via the session, AV engine 34 sends a request to scheduler 32 to reserve memory from reserved pool 41 for processing the file. The request specifies an amount of memory required to process the session. Scheduler 32 determines an amount of memory to reserve for the session, and adds an entry to dependency list 36. Scheduler 32 may be a dedicated scheduler that is part of an embedded system within anti-virus device 10. Anti-virus device 10 may execute other network communication protocols (not shown). Anti-virus device 10 may also present a user interface (not shown) by which an administrator may configure anti-virus device 10. For example, the administrator may configure anti-virus device 10 to monitor particular subnets of the enterprise network.

Heap 42 is a pool of available memory, such as random access memory (RAM). As an example, in an embedded environment of an intermediate network appliance, heap 42 may include 128 megabytes to one gigabyte of memory. Public buffer pool 40 and reserved buffer pool 41 represent logical data structures maintained on top of heap 42 that are used for allocating packet buffers to temporarily store incoming TCP packets using memory from heap 42. Scheduler 32 reserves an amount of memory from reserved buffer pool 41 sufficient to process at least one session to completion at a time. In the absence of excess congestion, scheduler 32 allocates packet buffers for all sessions from public buffer pool 40. If congestion occurs, scheduler 32 does not allocate from public buffer pool 40; instead, scheduler 32 allocates packet buffers from reserved buffer pool 41 based on a maximum amount currently reserved in reserved buffer pool 41. This is described in further detail below. Anti-virus device 10 establishes reserved buffer pool 41 during a system boot to pre-reserve memory for processing at least one session. The size of reserved buffer pool 41 is determined according to customer specifications. In particular, the size of reserved buffer pool 41 is selected to be as large as the largest potential amount of memory that a received file is likely to need to process the file. In one embodiment, reserved buffer pool 41 comprises ten megabytes of memory that is pre-reserved for processing at least one session.

As sessions are established, AV engine 34 makes requests to reserve memory from reserved buffer pool 41 for processing the sessions. Scheduler 32 calculates an amount of memory to be reserved such that at least the first session in dependency list 36 can be processed. AV engine 34 may also request memory directly from heap 42. Each of public buffer pool 40 and heap 42 have two associated memory usage "watermarks," i.e., first and second respective predetermined amounts of memory remaining, that trigger certain actions by AV device 10 when reached. In particular, each of public buffer pool 40 and heap 42 has a "low" watermark and a "too low" watermark. When the memory usage has not yet reached either of the "low" watermarks, scheduler 32 operates in a first mode (referred to as a "normal mode") by continuing to process all of the pending sessions, as described in further detail with respect to FIG. 5A. When the memory usage has reached one or both of the "low" watermarks, scheduler 32 operates in a second mode (referred to as a "constrained mode") by causing connection management module 30 to close the TCP windows for every session other than the first entry in dependency list 36, as described in further detail with respect to FIG. 5B. The watermark values may be hard-coded or programmably configured. Example "too low" watermark values are six megabytes remaining for heap 42 and eight megabytes remaining for public buffer pool 40. Example "low" watermark values are twelve megabytes remaining for heap 42 and sixteen megabytes remaining for public buffer pool 40 (i.e., an amount double the "two low" watermark values).

Scheduler 32 monitors the use of public buffer pool 40 and heap 42 as AV engine 34 processes files associated with a plurality of sessions. In particular, when one or both of pools 40, 42 reaches a memory usage watermark, scheduler 32 switches from operating in a normal mode to operating a constrained mode. In the normal mode, connection management module 30 keeps the TCP windows for all ongoing sessions open. Scheduler 32 maintains dependency list 36 as a subset of session list 38, and uses dependency list 36 when operating in the constrained mode to control the flow of incoming packets.

Scheduler 32 may add sessions to dependency list 36 in the order that scheduler 32 receives requests to reserve memory for the sessions. In the constrained mode, scheduler 32 sets flags that causes connection management module 30 to close the TCP windows for a subset of the sessions (e.g., all but the first session) on the dependency list 36. As a result, for each closed TCP window, the TCP session peer will stop sending traffic on the TCP session. When adding sessions to dependency list 36, scheduler 32 reserves enough memory in reserved buffer pool 41 for at least the first session to be processed. By reserving memory for sessions within the dependency list and forcing AV engine 34 to process only one session at a time when in the constrained mode, scheduler 32 guarantees that at least one session will be finished when operating in the constrained mode. Moreover, scheduler 32 guarantees that each of the sessions in the dependency list can sequentially be processed.

When the session is completed, scheduler 32 checks public buffer pool 40 and heap 42 to determine whether either of the watermarks is still exceeded. If so, scheduler 32 continues in the constrained mode, and processes the next session on the dependency list by opening that session's TCP window. If neither of the watermarks are exceeded, scheduler 32 switches back to the normal mode and connection management module 30 opens all of the TCP windows. AV engine 32 resumes processing the plurality of sessions in parallel.

In one example embodiment, anti-virus device 10 identifies packet flows in the monitored traffic, and transparently reassembles application-layer communications from the packet flows. An HTTP decoder identifies each request/response within the TCP connection as a different transaction. Scheduler 32 allocates a packet buffer from public buffer pool 40. TCP proxy 28 copies incoming packets associated with a TCP session to the packet buffer allocated from public buffer pool 40. Anti-virus device 10 may then put the packet buffer into a link list. AV engine 34 reassembles an application-layer communication from the data in the packet buffer, and scans the entire application-layer communication (e.g., a file or web page) for viruses. In the event no viruses are found, AV engine 34 breaks the application-layer communication back into pieces, which TCP proxy 28 then sends out to the destination of the communication in the form of packets. TCP proxy 28 informs scheduler 32 that processing associated with the session is finished, and scheduler 32 removes the completed session from dependency list 36 and makes the reserved memory available. A session may be added to the dependency list each time processing is to be performed for the session, i.e., when new work is detected for a session, such that a subsequent download may be detected as a new "session" as the term is used herein.

Example application programming interface (API) commands used by anti-virus device 10 are set forth below in Table 1.

TABLE 1

| API | Function |
| --- | --- |
| void apppry_sched_add_obj (av_ctx_t *av_ctx, size_t content_sz) | This function is used by AV engine 34 to notify scheduler 32 that a new session is created. The content_sz is the total memory resource required by the new session. If content_sz is 0, then scheduler 32 uses the max content size supported by the current system. The av_ctx is used by scheduler 32 to identify an AV connection (request). |
| void apppry_schduler_complete_obj (av_ctx_t *av_ctx) | This function is used by AV engine 34 to notify scheduler 32 that a session is to be removed. |
| int apppry_sched_get_net_pak ( void *tcb, void *flow_id, size_t sz, uint app_id, net_pak_t **pak) | This function is called by TCP Proxy 28 to allocate a new portion of public buffer pool 40 or reserved buffer pool 41. The void *tcb is a TCP proxy session descriptor. The flow_id is used by scheduler 32 to map a tcb to av_ctx. The sz is for buffer size. The app_id is used to identify the user of the portion of the buffer pool. The pak is an output pointer that points to the newly allocated portion of the buffer pool. |
| void apppry_sched_update_win (asp_tcb_t *tcb) | This function is called by Scheduler 32 to open the TCP window for a session: The tcb is used to identify a TCP Proxy session. This function will trigger TCP Proxy to reopen all un-opened windows on a session. |

Figure 3:
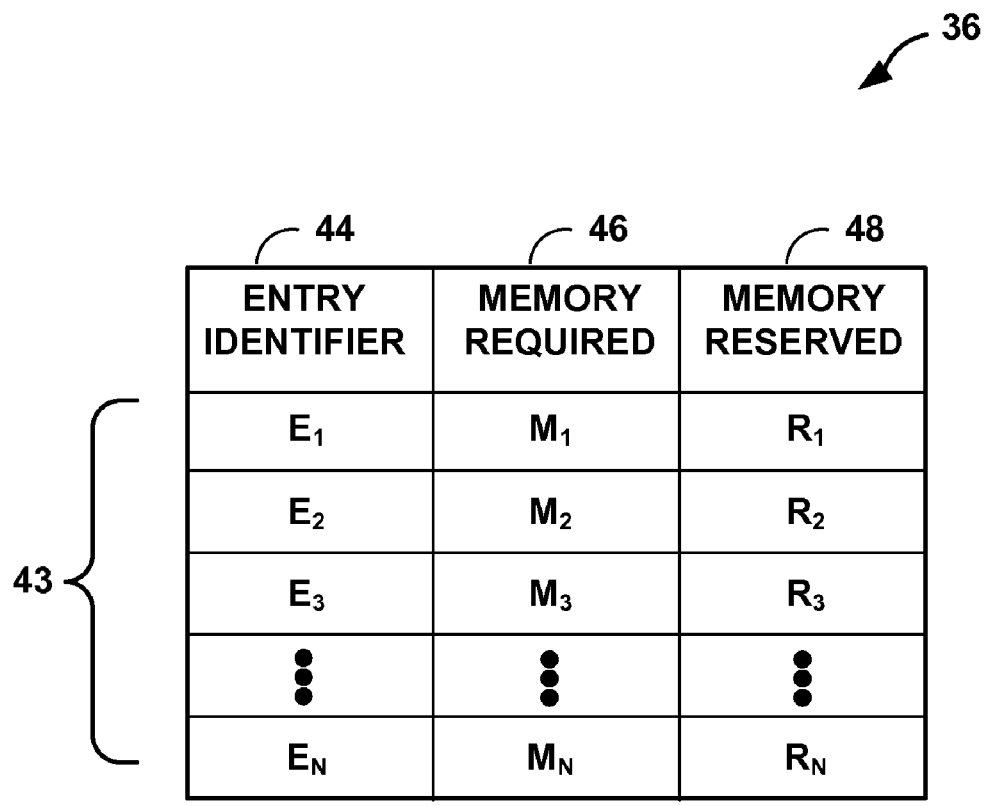
FIG. 3 is a block diagram illustrating an exemplary dependency list maintained by the anti-virus device.

FIG. 3 is a block diagram illustrating an exemplary dependency list 36 maintained by scheduler 32 of FIG. 2. In the example embodiment of FIG. 2, dependency list 36 includes a plurality of session entries 43. As described in further detail below with respect to FIG. 6, scheduler 32 adds a session entry to dependency list 36 when AV engine 34 detects that a new session has been established by TCP proxy 28 and requests memory to be reserved for the new session. Dependency list 36 includes an entry identifier column 44. An entry identifier 44 is used to label each of the session entries 43, and may indicate the order in which the sessions were added to dependency list 36.

In this example, dependency list 36 also includes a "memory required" column 46, which indicates the amount of memory (e.g., in bytes) that is required to process an object (e.g., a file) associated with the session. For example, when scheduler 32 receives notification from AV engine 34 that TCP proxy 28 has detected a new session or new work to be performed for an existing session, scheduler 32 also receives a request from AV engine 34 to reserve memory in reserved buffer pool 41. The request indicates the amount of memory that will be required to process the session. As one example, AV engine 34 may predict the amount of memory that a session will require based on the protocol associated with request for the session. As another example, if AV engine 34 is unable to determine an amount of memory required for the session, AV engine 34 may indicate this by specifying that the session requires zero memory. In response, scheduler 32 may assume the session will take the maximum amount the system can provide. This amount may be configured as a pre-defined amount, such as ten megabytes. If a received file requires more than the maximum amount, in some embodiments anti-virus device 10 will drop the file, while in other embodiments anti-virus device 10 will forward the file without scanning by AV engine 34.

Dependency list 36 also includes a memory reserved column 48, which shows an amount of memory (e.g., in bytes) that scheduler 32 has reserved for the session entry. Scheduler 32 determines an amount of memory in buffer pool 40 to reserve for processing the session by comparing the amount required to an amount currently reserved in reserved buffer pool 41 for sessions already stored within dependency list 36. If the amount currently reserved is less than the amount required by the new session, scheduler 32 reserves memory in reserved buffer pool 41 equal to the difference between the amount required and the amount currently reserved. Thus, once the sessions for the previous entries have been processed (i.e., the work for those sessions have been processed), enough reserved memory will be free for processing the new session. In other words, the new session inherits the total amount of reserved memory assigned to the sessions ahead of it in the dependency list. If the amount currently reserved is greater than or equal to the amount required by the new session, scheduler 32 does not reserve any additional memory, since sufficient memory for the new session will be released once the previous entries have finished processing. In some embodiments, dependency list 36 may contain additional information than is illustrated in the example of FIG. 3. As another example, dependency list 36 may factor in the priority levels of different sessions, instead of being organized solely on a first-come, first-served basis.

Dependency list 36 may be composed of a subset of the entries of session list 38. Anti-virus device 10 may maintain session list 38 and dependency list 36 in the form of one or more tables, databases, link lists, radix trees, databases, flat files, or any other data structures. In another embodiment, scheduler 32 may maintain multiple dependency lists to increase system performance. Using more than one dependency list may result in higher throughput when operating in the constrained mode, since multiple "first" session entries will be processed at one time (i.e., the first session on each dependency list).

Figure 4:
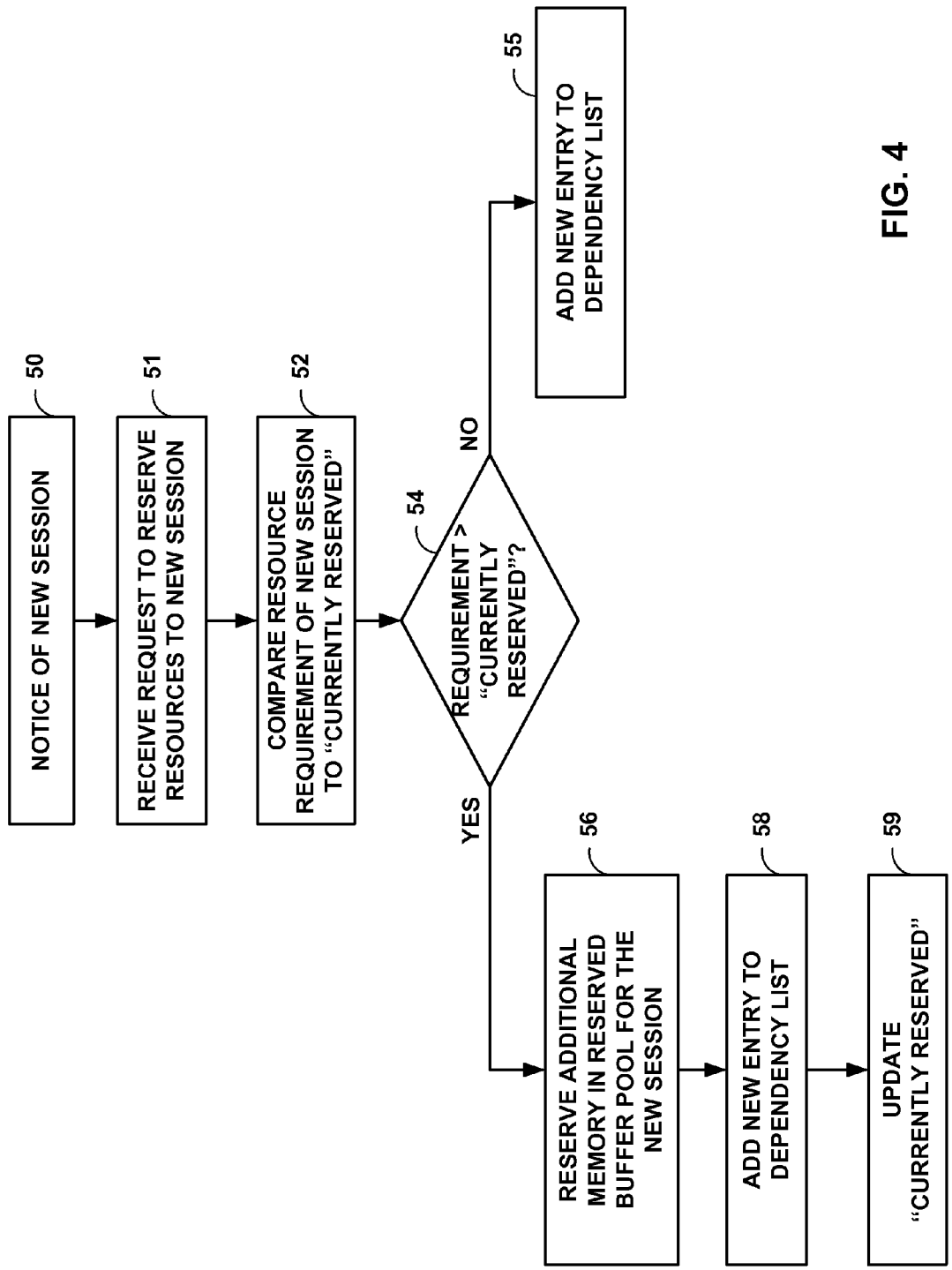
FIG. 4 is a flowchart illustrating exemplary operation of an anti-virus device in accordance with the principles of the invention.

FIG. 4 is a flowchart illustrating exemplary operation of anti-virus device 10 in accordance with the principles of the invention. TCP proxy 28 participates in creation of a new session between one of nodes 8 and another network device, such as external network device 16A. TCP proxy 28 notifies AV engine 34 of the new session (50). Scheduler 32 receives a request from AV engine 34 to reserve memory resources from reserved buffer pool 41 for the new session (51). Scheduler 32 compares the resource requirement of the new session to an amount currently reserved in reserved buffer pool 41 for all sessions already in dependency list 36 (52). Scheduler 32 may maintain the "currently reserved" amount as part of dependency list 36, or in a separate data structure. When the requirement of the new session is less than or equal to the currently reserved amount (NO branch of 54), scheduler 32 simply adds a new entry to dependency list 36, and does not reserve any additional memory of reserved buffer pool 41 (55). This is because once AV engine 34 finishes processing the sessions ahead of the session being added to dependency list 36, then sufficient memory resources will be available for processing the new session.

When the requirement of the new session is greater than the currently reserved amount (YES branch of 54), scheduler 32 reserves additional memory from reserved buffer pool 41 to the new session to cover the difference (56), so that when AV engine 34 finishes processing the sessions ahead of the new session on dependency list 36, sufficient memory resources will be available for processing the new session. In particular, scheduler 32 reserves an amount of memory equal to the difference between the memory required by the new session and the amount currently reserved for existing sessions. Scheduler 32 adds a new entry to dependency list 36 for the new session (58), and updates the stored "currently reserved" amount (59).

Figure 5A:
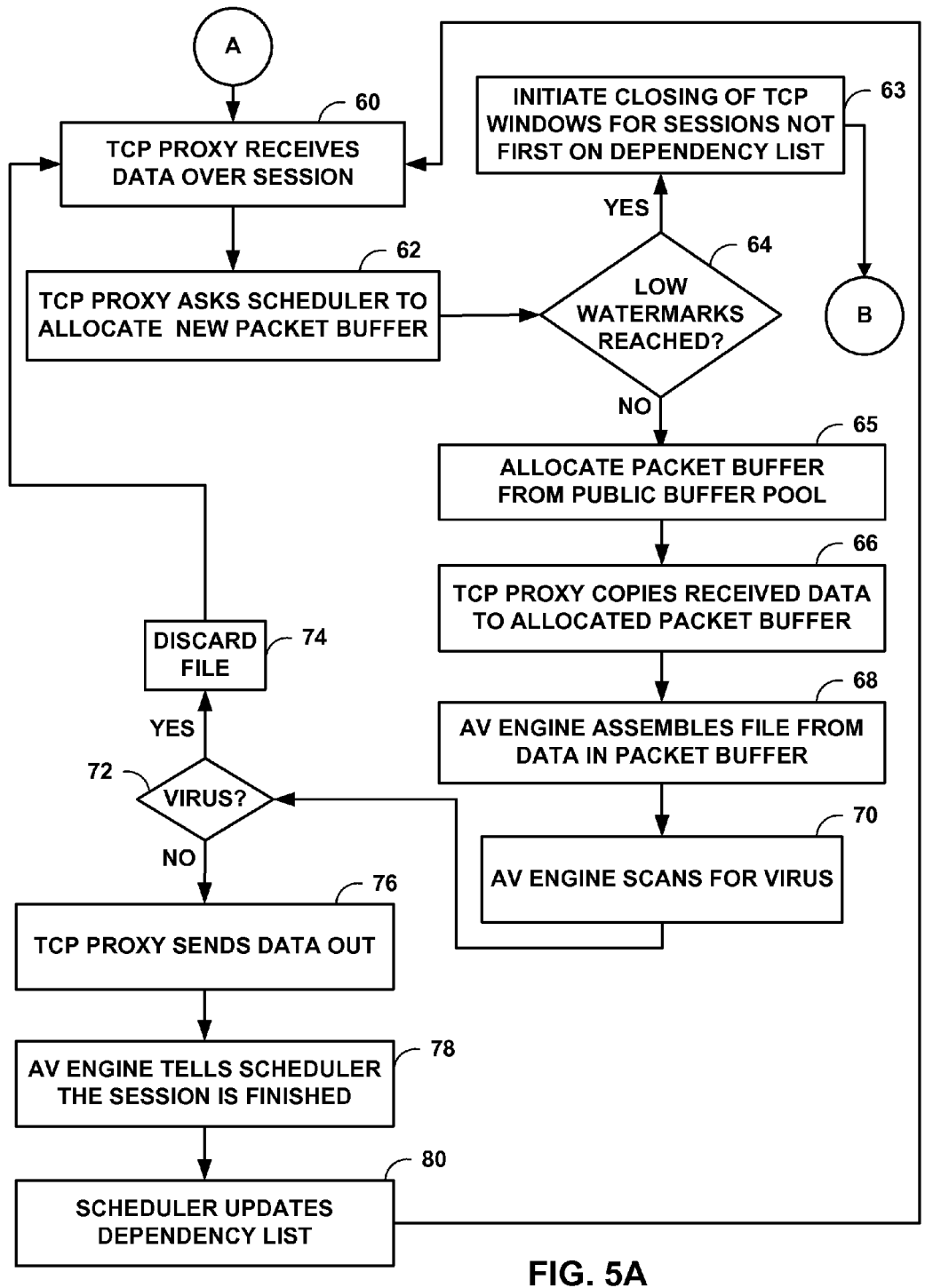
FIG. 5A is a flowchart illustrating exemplary operation of the anti-virus device according to a normal mode.

FIG. 5A is a flowchart illustrating exemplary operation of anti-virus device 10 according to the normal mode. When TCP proxy 28 receives data over the session (60), TCP proxy 28 asks scheduler 32 to allocate a new packet buffer for the received data (62). At this time scheduler 32 checks the "low" watermarks for public buffer pool 40 and heap 42. If one or both of the watermarks have been reached (YES branch of 63), connection management module 30 initiates closing of the TCP windows for all sessions except the first session on dependency list 36 in response to a flag set by scheduler 32 (64), and begins operating in the constrained mode ("B" of FIG. 5B). If neither of the watermarks is reached, scheduler 32 continues in the normal mode (NO branch of 64). Scheduler 32 allocates a packet buffer from public buffer pool 40 (65). TCP proxy 28 copies the received data to the allocated packet buffer (66). AV engine 34 assembles the file from buffer pool 40 once TCP proxy 28 has copied data corresponding to the entire file to buffer pool 40 (68).

AV engine 28 then scans the file for any viruses (70). In the event AV engine 28 detects a virus (YES branch of 72), anti-virus device 10 may take one or more programmed actions, such as automatically dropping packet flows associated with the application-layer communications within which the virus was detected (74). If AV engine 28 does not detect any viruses (NO branch of 104), TCP proxy 28 sends the file out to its destination (76). AV engine 28 notifies scheduler 32 the session is finished, and that the memory from this session is now available (78). Scheduler updates the dependency list by removing the entry associated with the session that has been completed, and recalculating the dependency list in view of the memory that has been made available (80).

Figure 5B:
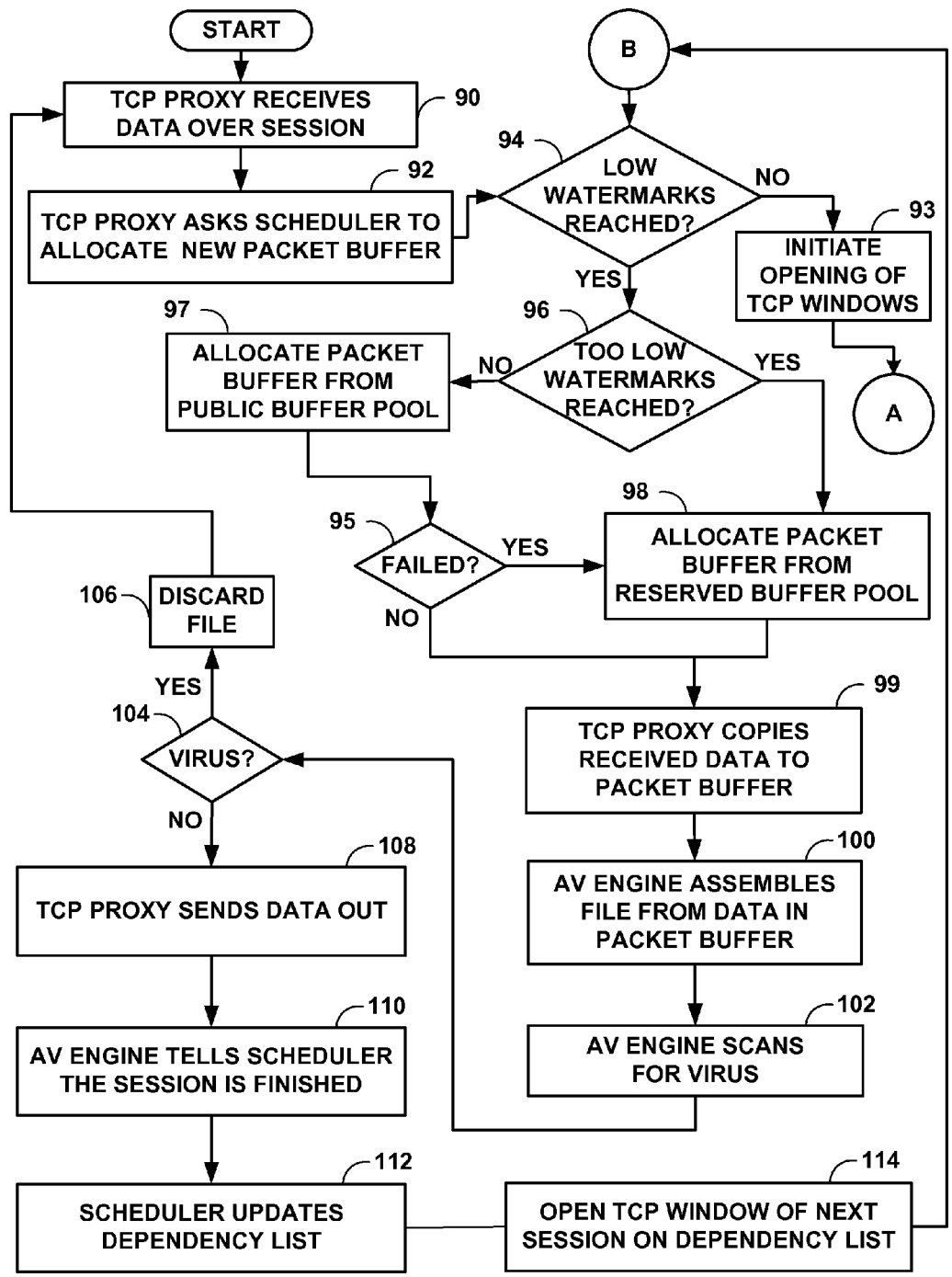
FIG. 5B is a flowchart illustrating exemplary operation of the anti-virus device according to a constrained mode.

FIG. 5B is a flowchart illustrating exemplary operation of anti-virus device 10 according to the constrained mode. When operating in the constrained mode, TCP proxy 28 may receive data over the first session (90). TCP proxy 28 asks scheduler 32 to allocate a new packet buffer for the received data (92). At this time scheduler 32 checks the "low" watermarks for public buffer pool 40 and heap 42 to see if they are still reached. If neither of the watermarks is reached, connection management module 30 initiates opening of the TCP windows for other sessions on the dependency list in response to a flag set by scheduler 32 (93) and scheduler 32 returns to operating in the normal mode (NO branch of 94) ("A" of FIG. 5A). If one or both of the watermarks is still reached (YES branch of 94), scheduler 32 checks the "too low" watermarks for public buffer pool 40 and heap 42. If neither of the "too low" watermarks has been reached (NO branch of 96), scheduler 32 allocates a packet buffer from public buffer pool 40 (97). If either of the "too low" watermarks has been reached (YES branch of 96), or if the allocation from the public buffer pool 40 fails (YES branch of 95), scheduler 32 allocates a packet buffer from reserved buffer pool (98). As mentioned, in some cases scheduler 32 will not be able to allocate a packet buffer from public buffer pool 40 even where the "too low" watermark has not yet been reached for public buffer pool 40. For example, this may result from fragmentation.

TCP proxy copies the received data to the allocated packet buffer (99). AV engine 34 assembles the file from buffer pool 40 once TCP proxy 28 has copied data corresponding to the entire file to the allocated packet buffer (100). AV engine 28 then scans the file for any viruses (102). In the event AV engine 28 detects a virus (YES branch of 104), anti-virus device 10 may take one or more programmed actions, such as automatically dropping packet flows associated with the application-layer communications within which the virus was detected (106). If AV engine 28 does not detect any viruses (NO branch of 104), TCP proxy 28 sends the file out to its destination (108). AV engine 28 notifies scheduler 32 the session is finished, and that the memory from this session is now available (110). Scheduler updates the dependency list by removing the entry associated with the session that has been completed, and recalculating the dependency list in view of the memory that has been made available (112). Scheduler 32 may again check again to see whether any of the memory usage watermarks have been reached by the system, and return to operating in the normal mode of FIG. 5A. (114). If any of the watermarks is still reached, scheduler 32 continues operating in the constrained mode, and opens the TCP window for the next session on dependency list 36 (114).

Figure 6:
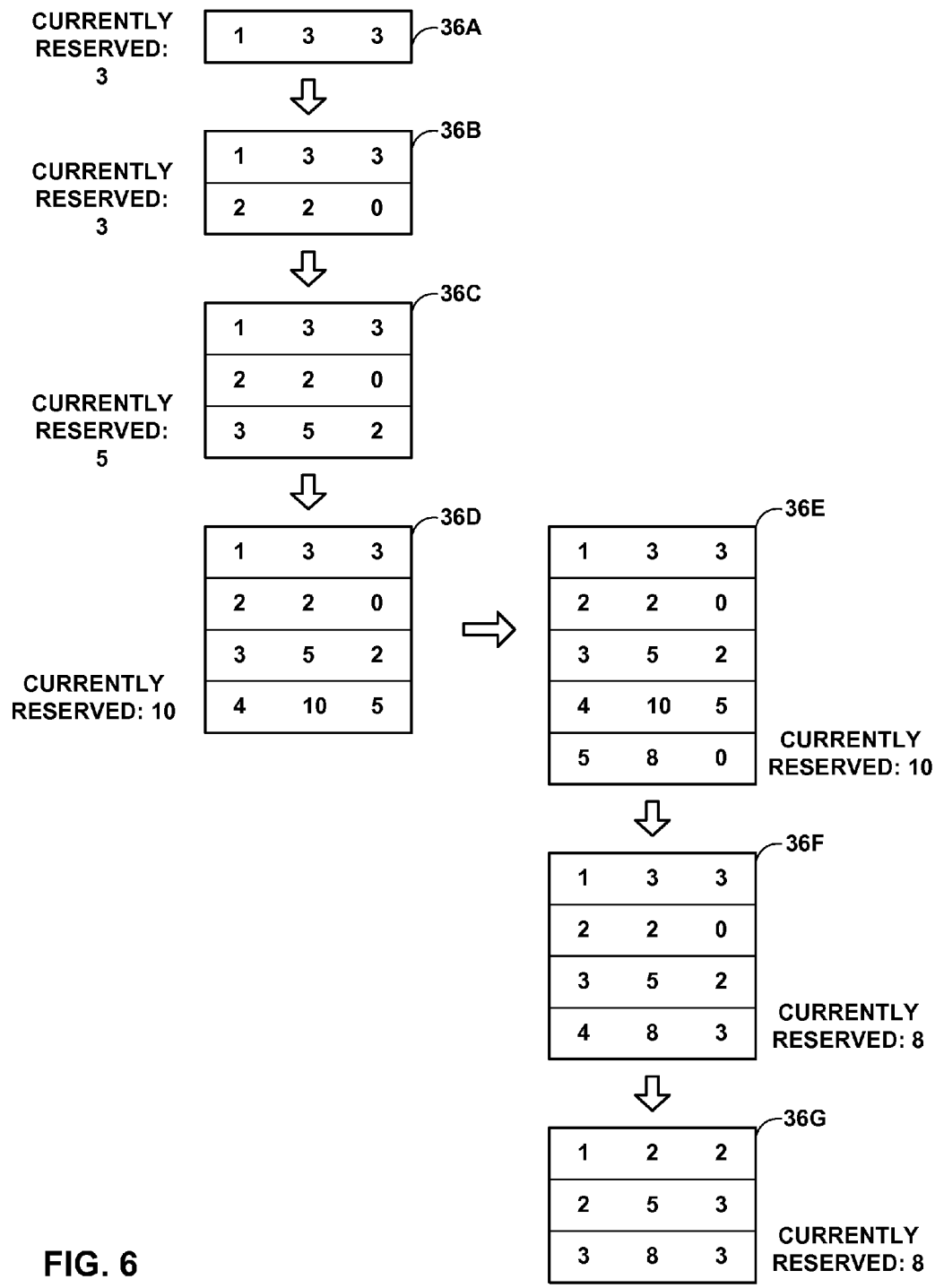
FIG. 6 is a flow diagram illustrating exemplary updates made to a dependency list maintained by the anti-virus device.

FIG. 6 is a flow diagram illustrating exemplary updates made to a dependency list 36 maintained by anti-virus device 10. That is, FIG. 7 is an example that illustrates how dependency list 36 changes over time as new sessions are added and existing sessions are completed and removed. As shown in dependency list 36A, a first session entry is added that requires three megabytes of memory, and scheduler 32 has reserved three megabytes of buffer pool 40 for this session. The amount of memory currently reserved is three megabytes. Some time later, a second session entry is added, as shown in 36B. The second session requires two megabytes of memory. Scheduler 32 compares the required memory to the amount of memory currently reserved. Since the required memory of the new session is less than the amount of memory currently reserved, scheduler 32 reserves zero additional megabytes of memory for the second entry, since the first session will free up sufficient memory (three megabytes) upon completion to cover the needs of the second session. The amount of memory currently reserved is still three megabytes.

Some time later, a third session entry is added, as shown in 36C. The third session requires five megabytes of memory. Scheduler 32 compares the required memory to the amount of memory currently reserved. Since the required memory of the new session is greater than the amount of memory currently reserved, scheduler 32 reserves two additional megabytes of memory for the third entry. As a result, once the first and second sessions have completed, three megabytes will become available. With the addition of the two megabytes reserved for the third session, five megabytes will be available for processing the third session. The amount of memory currently reserved is five megabytes.

Some time later, a fourth session entry is added, as shown in 36D. The fourth session requires ten megabytes of memory. Scheduler 32 reserves five additional megabytes of memory for the third entry, which is equal to the difference between the memory required and the currently reserved five megabytes. The amount of memory currently reserved is now ten megabytes.

Some time later, a fifth session entry is added, as shown in 36E. The fifth session requires eight megabytes of memory. Scheduler 32 compares the required memory to the amount of memory currently reserved. Since the required memory of the new session is less than the amount of memory currently reserved, scheduler 32 reserves zero additional megabytes of memory for the fifth entry, since the preceding sessions will free up sufficient memory upon completion to cover the needs of the fifth session. The amount of memory currently reserved is still ten megabytes.

Some time later, the fourth entry of dependency list 36E has completed and is removed from the dependency list, as shown in dependency list 36F. The fifth session moves up to become the fourth session and scheduler 32 recalculates the dependency list. Entries one through three remain the same. Scheduler reserves three megabytes of memory from buffer pool 40 to cover the difference between the amount that will become available after the previous sessions are completed, and the amount required by the fourth entry. The amount of memory currently reserved is now eight megabytes. As this example illustrates, sessions are not necessarily completed in the order they were added to dependency list 36, particularly when scheduler 32 is operating in normal mode.

Some time later, the first entry of dependency list 36F has completed and is removed from the dependency list, as shown in dependency list 36G. Scheduler 32 moves each of the remaining sessions up in the dependency list, and recalculates the dependency list. The session of the first entry of dependency list 36G requires two megabytes of memory, so scheduler 32 reserves two megabytes of memory to the first session. The second session on dependency list 36G requires five megabytes of memory, which is three megabytes more than is reserved for previous sessions, so scheduler 32 reserves three megabytes of memory to the second session. The third session on dependency list 36G requires eight megabytes of memory, which is three megabytes more than is reserved for previous sessions, so scheduler 32 reserves three megabytes of memory to the third session. The amount of memory currently reserved is eight megabytes.

Various embodiments of the invention have been described. These and other embodiments are within the scope of the following claims.

The invention claimed is:

1. An anti-virus device for processing communication sessions comprising:
   an internal memory;
   an anti-virus engine that performs file-based anti-virus scanning on network traffic received via communication sessions using the internal memory; and
   a resource scheduler module that prevents the communication sessions from timing out by allocating memory from the internal memory so that at least one of the communication sessions is guaranteed to be processed to completion.

2. The device of claim 1, wherein the resource scheduler module is configured such that:
   when available memory has not reached a predetermined amount remaining, the resource scheduler module operates in a first mode to cause the anti-virus engine to process the communication sessions in parallel; and
   when available memory reaches a predetermined amount remaining, the resource scheduler module operates in a second mode to cause the anti-virus engine to process the communication sessions sequentially in accordance with a dependency list of communication sessions maintained by the resource scheduler module, wherein the dependency list specifies an order in which to process the communications sessions and specifies an amount of memory currently reserved for each of the communication sessions.

3. The device of claim 2, further comprising:
   an anti-virus engine that processes the communication sessions in accordance with the dependency list; and
   a proxy module that receives a request to reserve memory for processing a new communication session;
   wherein the resource scheduler module determines whether an amount of memory required to process the new communication session is greater than a total amount of memory reserved for the communication sessions already listed within the dependency list, and
   wherein when the amount of memory required to process the new communication session is greater than the total amount of memory reserved for the communication sessions already listed within the dependency list, the resource scheduler module reserves memory for the new communication session in an amount equal to a difference between the amount of memory required to process the new communication session and the total amount of memory currently reserved for the communication sessions already listed to guarantee that processing of the new communication session can be completed upon processing the communication sessions already listed within the dependency list.

4. The device of claim 3, wherein the proxy module is a Transmission Control Protocol (TCP) proxy module, and wherein the communication sessions are TCP sessions.

5. The device of claim 2, further comprising a connection management module that dynamically initiates closing of communication windows for the communication sessions other than the first communication session on the dependency list when the scheduler operates in the second mode.

6. The device of claim 1, wherein the internal memory comprises:
   a heap of available memory;
   a public buffer pool; and
   a reserved buffer pool, wherein the public buffer pool and the reserved buffer pool are maintained as logical data structures on top of the heap and used for allocating packet buffers to store packets received via the communication sessions,
   wherein the resource scheduler module operates in a first mode when neither the available memory within the heap nor available memory within the public buffer pool has reached a respective predetermined amount, and
   wherein the resource scheduler module operates in a second mode when either the available memory within the heap or the available memory within the public buffer pool has reached a respective predetermined amount.

7. A method comprising:
   with an anti-virus device, performing file-based anti-virus scanning on network traffic received via communication sessions using an internal memory of the anti-virus device; and
   preventing the communication sessions from timing out by allocating memory with a resource scheduler module of the anti-virus device from the internal memory so that at least one of the communication sessions is guaranteed to be processed to completion.

8. The method of claim 7, further comprising:
   when available memory has not reached a predetermined amount remaining, processing the communication sessions in a first mode comprising processing the communication sessions in parallel; and
   when available memory reaches a predetermined amount remaining, processing the communication sessions in a second mode comprising processing the communication sessions sequentially in accordance with a dependency list of communication sessions maintained by the resource scheduler module, wherein the dependency list specifies an order in which to process the communications sessions and specifies an amount of memory currently reserved for each of the communication sessions.

9. The method of claim 8, wherein processing the communication sessions in the second mode comprises dynamically initiating closing of communication windows for the communication sessions other than a first communication session on the dependency list.

10. The method of claim 8, further comprising:
    when an amount of memory required to process a new communication session is less than or equal to the total amount of memory reserved for communication sessions already listed within the dependency list, reserving no additional memory for the new communication session.

11. The method of claim 10, wherein the amount of memory required to process the new communication session is determined based on protocol information associated with the new communication session.

12. A non-transitory computer-readable storage medium comprising instructions for causing a programmable processor to:
    perform file-based anti-virus scanning on network traffic received via communication sessions using an internal memory of the anti-virus device; and
    prevent the communication sessions from timing out by allocating memory from the internal memory so that at least one of the communication sessions is guaranteed to be processed to completion.

* * * * *